(12) United States Patent
Song

(10) Patent No.: US 9,837,851 B2
(45) Date of Patent: Dec. 5, 2017

(54) WIRELESS POWER TRANSMITTER FOR SUPPORTING MULTIPLE CHARGING SCHEMES

(71) Applicant: LG INNOTEK CO., LTD., Seoul (KR)

(72) Inventor: Young Kil Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/375,280

(22) Filed: Dec. 12, 2016

(65) Prior Publication Data

US 2017/0104360 A1    Apr. 13, 2017

Related U.S. Application Data

(63) Continuation of application No. 14/510,752, filed on Oct. 9, 2014, now Pat. No. 9,553,478.

(30) Foreign Application Priority Data

Oct. 10, 2013 (KR) .................... 10-2013-0120504

(51) Int. Cl.
| | | |
|---|---|---|
| *H01M 10/46* | (2006.01) | |
| *H02J 7/02* | (2016.01) | |
| *H02J 7/00* | (2006.01) | |
| *H02J 5/00* | (2016.01) | |
| *H02J 50/12* | (2016.01) | |
| *H02J 50/40* | (2016.01) | |

(52) U.S. Cl.
CPC ............. *H02J 7/025* (2013.01); *H02J 5/005* (2013.01); *H02J 7/0042* (2013.01); *H02J 50/12* (2016.02); *H02J 50/40* (2016.02)

(58) Field of Classification Search
CPC .......... H02J 7/025; H02J 7/355; H02J 7/0042; H02J 5/005; H02J 50/00
USPC ................... 320/108, 114, 115, 137; 307/104
See application file for complete search history.

(56) References Cited

U.S. PATENT DOCUMENTS

| | | |
|---|---|---|
| 9,553,478 B2 * | 1/2017 | Song ................ H02J 7/025 |
| 2005/0156560 A1 | 7/2005 | Shimaoka et al. |
| 2009/0106567 A1 | 4/2009 | Baarman |

(Continued)

FOREIGN PATENT DOCUMENTS

| | | |
|---|---|---|
| JP | 2004-007851 | 1/2004 |
| JP | 2010-193701 | 9/2010 |

(Continued)

OTHER PUBLICATIONS

Korean Office Action dated Aug. 28, 2014 issued in Application No. 10-2013-0120504.

(Continued)

*Primary Examiner* — Edward Tso
(74) *Attorney, Agent, or Firm* — KED & Associates, LLP

(57) ABSTRACT

The wireless power transmitter includes a first wireless transmitting unit disposed at a rear surface of the wireless power receiver and having a first charging scheme, and a second wireless transmitting unit disposed on at least one of side surfaces of the wireless power receiver and having a second charging scheme different from the first charging scheme. The wireless power transmitter may more efficiently charge the wireless power receiver.

20 Claims, 9 Drawing Sheets

(56) References Cited

U.S. PATENT DOCUMENTS

| | | |
|---|---|---|
| 2011/0018360 A1 | 1/2011 | Baarman et al. |
| 2011/0140671 A1 | 6/2011 | Kim et al. |
| 2012/0132646 A1 | 5/2012 | England et al. |
| 2013/0082535 A1 | 4/2013 | Miyauchi et al. |
| 2013/0107023 A1 | 5/2013 | Tanaka et al. |
| 2014/0091756 A1 | 4/2014 | Ofstein et al. |
| 2014/0210406 A1 | 7/2014 | Na et al. |
| 2014/0327409 A1 | 11/2014 | Lee et al. |

FOREIGN PATENT DOCUMENTS

| | | |
|---|---|---|
| JP | 2013-085436 | 5/2013 |
| KR | 10-2011-0066827 | 6/2011 |
| KR | 10-1114601 | 2/2012 |
| KR | 10-2012-0047027 | 5/2012 |
| KR | 10-2013-0005571 | 1/2013 |
| KR | 10-2013-0024757 | 3/2013 |
| WO | WO 2010/093723 | 8/2010 |
| WO | WO 2011/091528 | 8/2011 |
| WO | WO 2013/005415 | 1/2013 |
| WO | WO 2013/035986 | 3/2013 |

OTHER PUBLICATIONS

International Search Report dated Feb. 6, 2015 issued in Application No. PCT/KR2014/009495 (Full English Text).
Korean Office Action dated Aug. 1, 2015 issued in Application No. 10-2015-0065313.
Korean Office Action dated Apr. 14, 2016 issued in Application No. 10-2015-0065313.
U.S. Office Action dated Jun. 17, 2016 issued in U.S. Appl. No. 14/510,752.
Korean Office Action dated Jul. 5, 2016 issued in Application No. 10-2015-0065313.
U.S. Notice of Allowance dated Sep. 13, 2016 issued in U.S. Appl. No. 14/510,752.
European Search Report dated May 31, 2017 issued in Application No. 14852170.1.

\* cited by examiner

FIG. 4
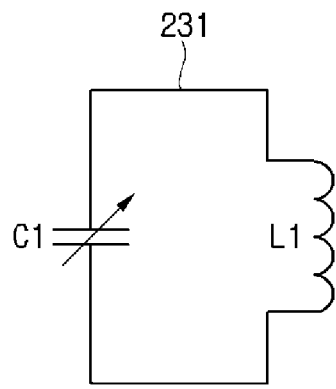
(a)
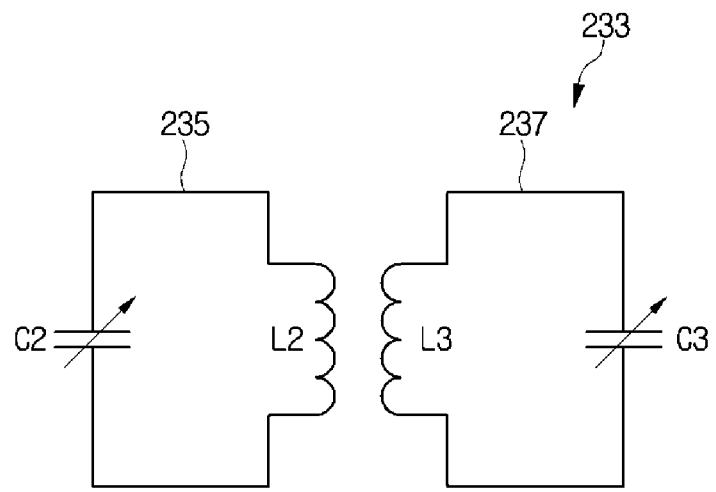
(b)

FIG.6
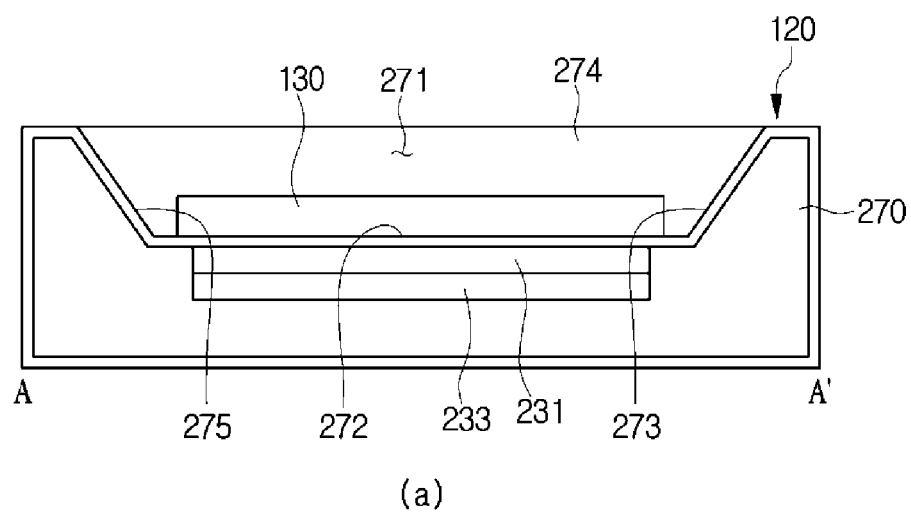
(a)
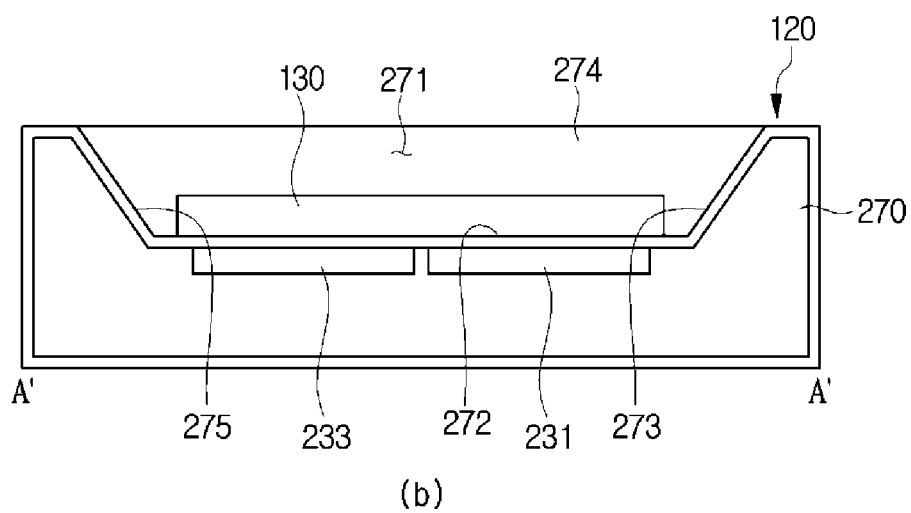
(b)

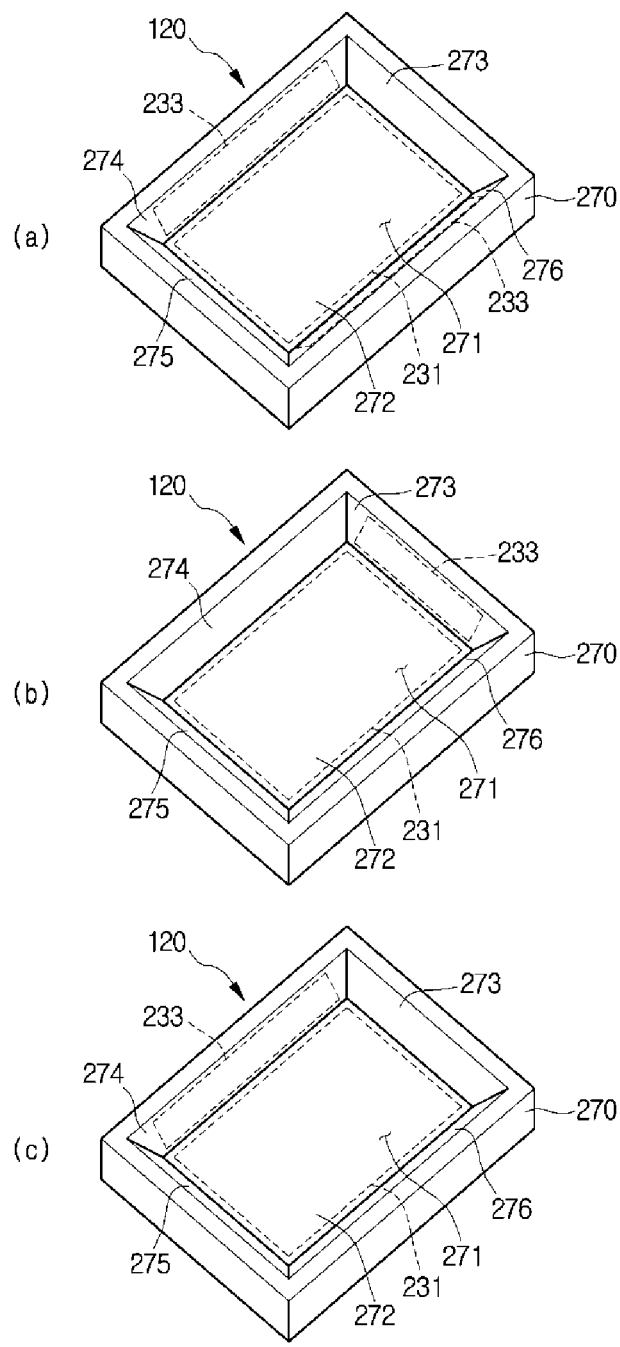

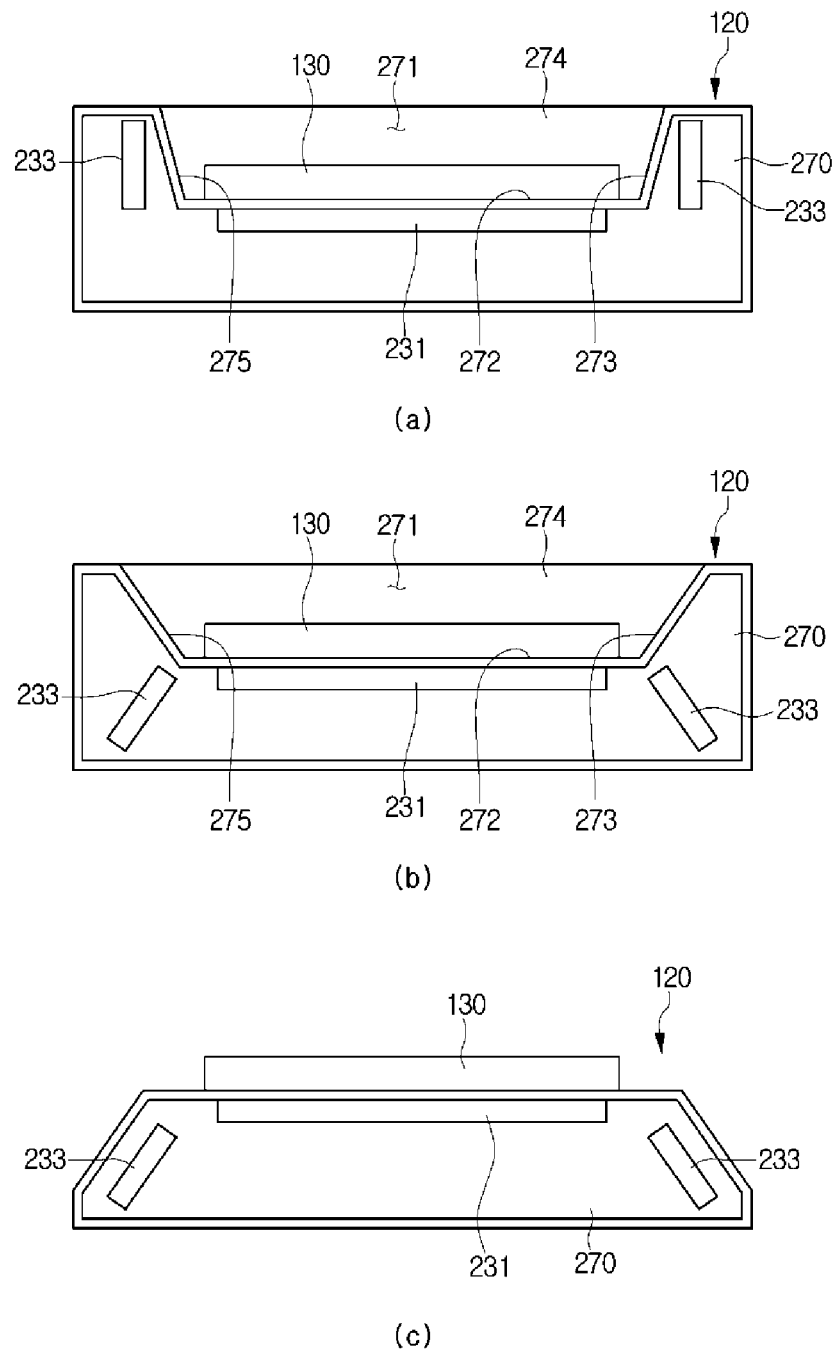

WIRELESS POWER TRANSMITTER FOR SUPPORTING MULTIPLE CHARGING SCHEMES

CROSS-REFERENCE TO RELATED APPLICATION

This application is a Continuation Application of prior U.S. patent application Ser. No. 14/510,752 filed Oct. 9, 2014, which claims priority under 35 U.S.C. §119 to Korean Application No. 10-2013-0120504 filed on Oct. 10, 2013, whose entire disclosure is hereby incorporated by reference.

BACKGROUND

1. Field

The embodiment relates to a wireless power charging system, and more particularly, to a wireless power transmitter for a wireless power charging system.

2. Background

Various kinds of electronic appliances employ batteries and are driven by using the power charged in the batteries. In this case, the battery of an electron appliance may be exchanged or may be recharged. The electronic appliance may include a contact terminal for making contact with an external charging apparatus in order to charge the battery. The electronic appliance is electrically connected to the charging apparatus through the contact terminal. However, the contact terminal may be exposed to an outside of the electronic appliance, so that the contact terminal may be contaminated or shot-circuited due to moisture. In this case, a contact error may be generated between the contact terminal and the charging apparatus so that the battery of the electronic appliance may not be charged.

There has been proposed a wireless power charging system for wirelessly charging an electronic appliance. The wireless power charging system includes a wireless power transmitter for wirelessly supplying power to an electronic appliance. In this case, the electronic appliance receives power according to a preset charging scheme. In order to charge the electronic appliance, the wireless power transmitter must supply power to the electronic appliance in the same charging scheme as that of the electronic appliance. When the wireless power transmitter is set in a charging scheme different from that of the electronic appliance, the wireless power transmitter does not charge the electronic appliance.

BRIEF DESCRIPTION OF THE DRAWINGS

The embodiments will be described in detail with reference to the following drawings in which like reference numerals refer to like elements wherein:

FIG. 4 is a circuit view showing equivalent circuit diagrams of the wireless transmitting units in FIG. 2.

FIG. 6 shows sectional views taken along line A-A' of FIG. 5.

FIG. 9 illustrates perspective views showing modified examples of a wireless power transmitter according to a second embodiment.

FIG. 10 illustrates sectional views showing modified examples of a wireless power transmitter according to a second embodiment.

DETAILED DESCRIPTION OF THE EMBODIMENTS

Figure 1:
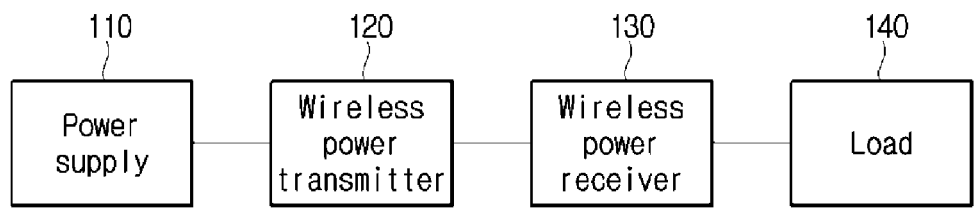
FIG. 1 is a block diagram showing a wireless power charging system according to an embodiment.

FIG. 1 is a block diagram showing a wireless power charging system according to an embodiment. A wireless power charging system 10 according to the embodiment includes a power supply 110, a wireless power transmitter 120, a wireless power receiver 130 and a load 140. The power supply 110 and the wireless power transmitter 120 may be implemented in a single configuration. The wireless power receiver 130 and the load 140 may be implemented in a single configuration such as an electronic appliance.

The power supply 110 supplies power to the wireless power transmitter 120. The power supply 110 may supply AC power to the wireless power transmitter 120. The power supply 110 may generate a DC voltage. The power supply 110 may convert the DC voltage into a preset reference value. Meanwhile, the power supply 110 may generate an AC signal having a predetermined frequency. The power supply 110 may generate AC power by using the DC voltage and the AC signal.

The wireless power transmitter 120 receives power from the power supply 110 and wirelessly transmits power. The wireless power transmitter 120 transmits power in various charging schemes. The charging schemes may include an electromagnetic induction scheme, a resonance scheme and an RF/micro wave radiation scheme. A plurality of charging schemes may be set to the wireless power transmitter 120. The wireless power transmitter 120 may transmit power by using one of the charging schemes. The wireless power transmitter 120 may select one from the charging schemes corresponding to the wireless power receiver 130.

The wireless power receiver 130 receives power from the wireless power transmitter 120 and transfers the power to the load 140. The wireless power receiver 130 receives power in a preset charging scheme. The charging scheme of the wireless power receiver 130 may be one of the electromagnetic induction scheme, the resonance scheme and the RF/micro wave radiation scheme.

The load 140 receives power from the wireless power receiver 130 and is substantially charged. The load 140 is driven by using the power. The load 140 may store the power and if necessary, the load 140 may use the power. For example, the load 140 may include a storage unit such as a battery.

Figure 2:
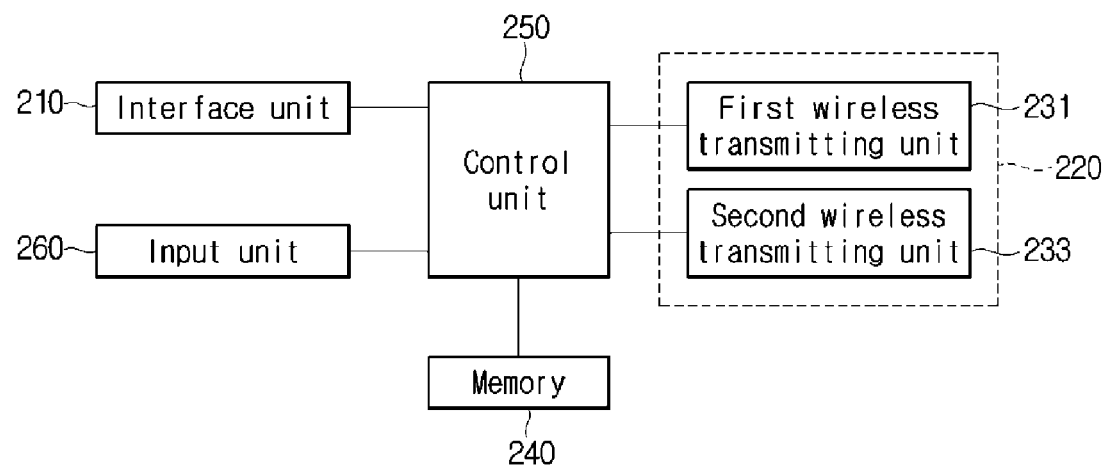
FIG. 2 is a block diagram showing a wireless power transmitter according to an embodiment.
Figure 3:
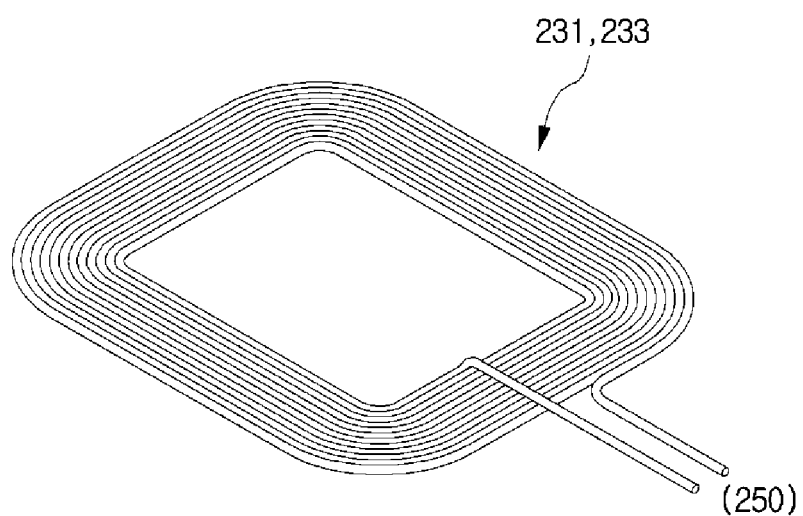
FIG. 3 is a view showing examples of configurations of the wireless transmitting units in FIG. 2.

FIG. 2 is a block diagram showing a wireless power transmitter according to an embodiment. FIG. 3 is a view showing examples of configurations of the wireless transmitting units in FIG. 2. FIG. 4 is a circuit view showing equivalent circuit diagrams of the wireless transmitting units in FIG. 2, where (a) is an equivalent circuit diagram of a first wireless transmitting unit and (b) is an equivalent circuit diagram of a second wireless transmitting unit.

Referring to FIG. 2, the wireless power transmitter 120 includes an interface unit 210, a wireless transmitting unit 220, a memory 240, a control unit 250 and an input unit 260. The interface unit 210 provides an interface between the wireless power transmitter 120 and the power supply 110.

The interface unit 210 is electrically connected to the power supply 110. The interface unit 210 receives power from the power supply 110.

The wireless transmitting unit 220 wirelessly transmits power to the wireless power transmitter 120. The wireless transmitting unit 220 transmits power in various charging schemes. The charging schemes include the electromagnetic induction scheme, the resonance scheme and the RF/micro wave radiation scheme. The wireless transmitting unit 220 includes first and second wireless transmitting units 231 and 233. The first and second transmitting units 231 and 233 have mutually different charging schemes. One of the first and second transmitting units 231 and 233 is selectively driven to transmit power.

Each of the first and second transmitting units 231 and 233 may include at least one coil. For example, the coil may be implemented as shown in FIG. 3. That is, the coil is a plane type and can be formed by winding wires clockwise or counterclockwise. One end and the opposite end of the wire may protrude from an inside of the coil to an outside of the coil in parallel with each other. One end of the wire may cross an upper or low portion of the coil.

The first wireless transmitting unit 231 has a first charging scheme. The first charging scheme may be the electromagnetic induction scheme. The first wireless transmitting unit 231 may be configured as shown in (a) of FIG. 4. That is, the first wireless transmitting unit 231 includes a first inductor L1 and a first capacitor C1 which may be connected in parallel with each other. The first wireless transmitting unit 231 may transmit power to the wireless power receiver 130 in the first charging scheme, that is, the electromagnetic induction scheme.

The second wireless transmitting unit 233 has a second charging scheme. The second charging scheme may be the resonance scheme. The second wireless transmitting unit 233 may be configured as shown in (b) of FIG. 4. The second wireless transmitting unit 233 includes a transmission induction coil 235 and a transmission resonant coil 237.

The transmission induction coil 235 includes a second inductor L2 and a second capacitor C2 which may be connected in parallel with each other. The transmission resonant coil 237 includes a third inductor L3 and a third capacitor C3 which may be connected in parallel with each other. The second wireless transmitting unit 233 may transmit power to the wireless power receiver 130 in the second charging scheme, that is, the resonance scheme. The transmission induction coil 235 may transmit power to the transmission resonant coil 237 in the electromagnetic induction scheme and the transmission resonant coil 237 may transmit power to the wireless power receiver 130 in the resonance scheme.

The memory 240 includes a program memory and a data memory. The program memory stores programs for controlling an operation of the wireless power transmitter 120. The program memory may stores for transmitting power in various charging schemes. The data memory stores data generated while the programs are executed. The data memory may store mapping information of the first wireless transmitting unit 231 with the first charging scheme and mapping information of the second wireless transmitting unit 231 with the second charging scheme.

The control unit 250 controls operations of the wireless power transmitter 120. The control unit 250 controls the wireless transmitting unit 220 to transmit power in various charging schemes. The control unit 250 may transmit power by using one of the charging schemes. The control unit 250 may select one from the charging schemes corresponding to the wireless power receiver 130 to drive the wireless transmitting unit 220.

For example, when the wireless power receiver 130 is set into the first charging scheme, the control unit 250 may drive the first wireless transmitting unit 231 to transmit power in the first charging scheme. When the wireless power receiver 130 is set into the second charging scheme, the control unit 250 may drive the second wireless transmitting unit 233 to transmit power in the second charging scheme.

The input unit 260 generates an event for setting or executing a function of the wireless power transmitter 120. In this case, the input unit 160 may an event showing a charging scheme of the wireless power receiver 130.

Figure 5:
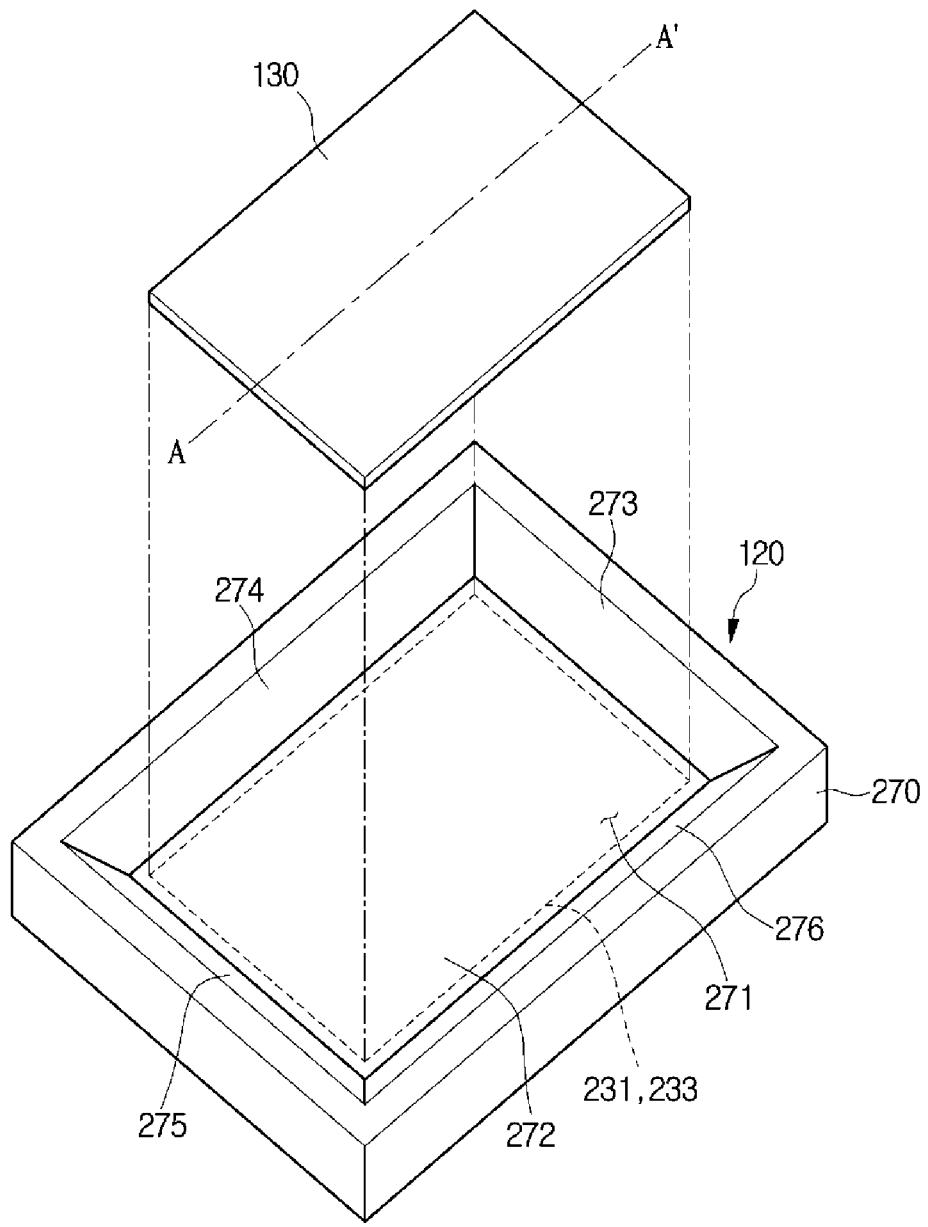
FIG. 5 is a perspective view showing a wireless power transmitter according to a first embodiment.

FIG. 5 is a perspective view showing a wireless power transmitter according to a first embodiment. FIG. 6 shows sectional views taken along line A-A' of FIG. 5, where (a) shows one example of a wireless power transmitter according to a first embodiment and (b) shows another example of a wireless power transmitter according to a second embodiment. Referring to FIGS. 5 and 6, the wireless power transmitter 120 of the embodiment further includes a housing 270.

At least a part of the wireless power transmitter 120 is accommodated in the housing 270. The wireless transmitting unit 220 is accommodated in the housing 270. The housing 270 allows a position and a posture of the wireless transmitting unit 220 (e.g., 231 and 233) to be fixed in the wireless power transmitter 120. In addition, the wireless power receiver 130 is supported in the housing 270. That is, the housing 270 fixes a position and a posture of the wireless power receiver 130 in the wireless power transmitter 120. The wireless transmitting unit 220 (e.g., 231 and 233) is disposed on a rear surface of the wireless power receiver 130.

The receiving groove 271 may be formed in the housing 270. The housing 270 may receive the wireless power receiver 130 through the receiving groove 271. An upper portion of the housing 270 may be recessed to form the receiving groove 271. A size of the receiving groove 271 may exceed a size of the wireless power receiver 130. The housing 270 may include a bottom surface 272 and inner side surfaces 273, 274, 275 and 276 in the receiving groove 271. The bottom surface 272 may be disposed on the rear surface of the wireless power receiver 130, and the inner side surfaces 273, 274, 275 and 276 may be disposed on side surfaces of the wireless power receiver 130. That is, the wireless transmitting unit 220 (e.g., 231 and 233) may be disposed on the bottom surface 272 at an inside of the housing 270.

The first and second wireless transmitting units 231 and 233 may be vertically stacked as shown in (a) of FIG. 6. The first wireless transmitting unit 231 may be stacked on the second wireless transmitting unit 233. The first wireless transmitting unit 231 may be closer to the wireless power receiver 130 as compared with the second wireless transmitting unit 233. Because the first and second wireless transmitting units 231 and 233 are vertically stacked, interference may occur between the first and second wireless transmitting units 231 and 233. The charging efficiency of the wireless power receiver 130 may be deteriorated due to the wireless power transmitter 120.

The first and second wireless transmitting units 231 and 233 may be disposed in parallel with each other as shown in (b) of FIG. 6. The first and second wireless transmitting units 231 and 233 may be disposed on the rear surface of the wireless power receiver 130 separately from each other. The first wireless transmitting unit 231 may be disposed in an area of the rear surface of the wireless power receiver 130 and the second wireless transmitting unit 233 may be disposed in the remaining area of the rear surface of the wireless power receiver 130. Because the first and second wireless transmitting units 231 and 233 are disposed on the rear surface of the wireless power receiver 130 separately from each other, an overlap area of the first wireless transmitting unit 231 and the wireless power receiver 130 and an overlap area of the second wireless transmitting unit 233 and the wireless power receiver 130 are reduced. For this reason, the charging efficiency in the wireless power transmitter 120 for the wireless power receiver 130 may be deteriorated.

Figure 7:
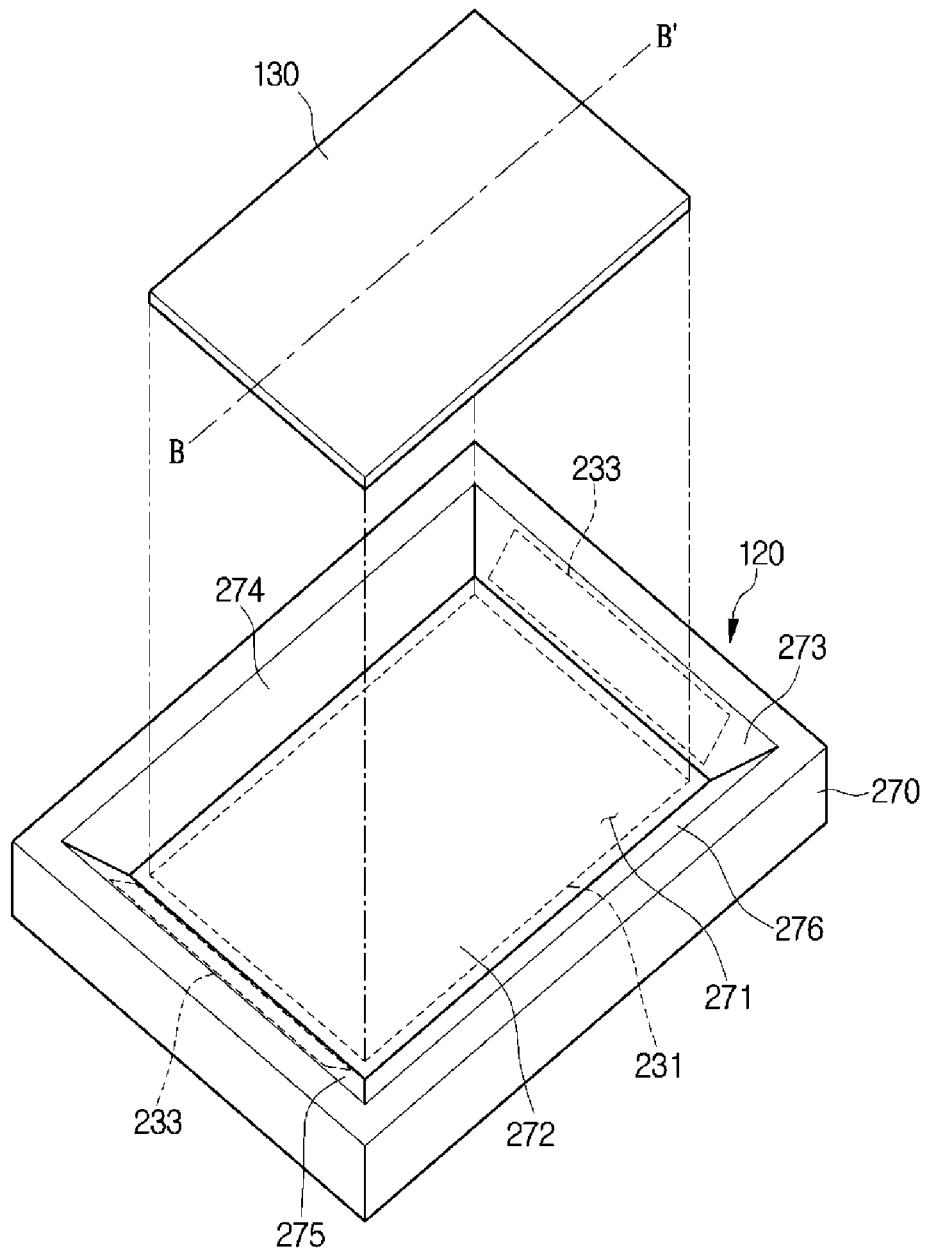
FIG. 7 is a perspective view showing a wireless power transmitter according to a second embodiment.
Figure 8:
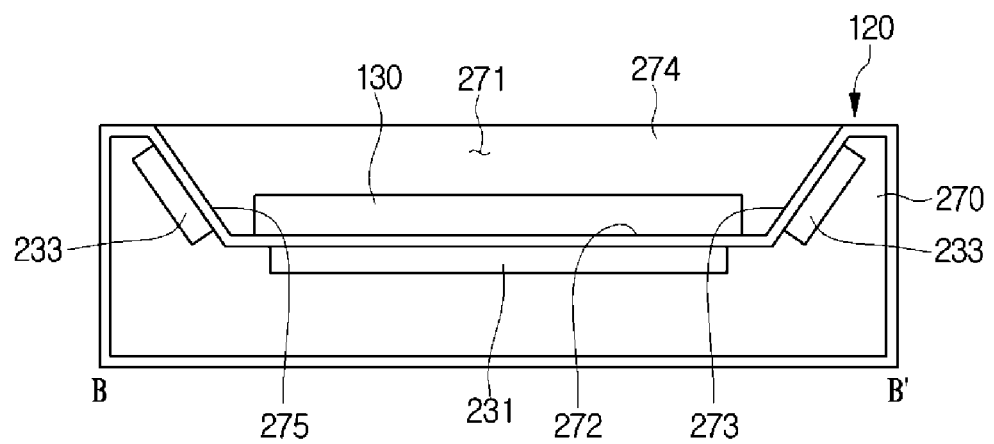
FIG. 8 is a sectional view taken along line B-B' of FIG. 7.

FIG. 7 is a perspective view showing a wireless power transmitter according to a second embodiment. FIG. 8 is a sectional view taken along line B-B' of FIG. 7. FIG. 9 illustrates perspective views showing modified examples of a wireless power transmitter according to a second embodiment.

Referring to FIGS. 7 and 8, the wireless power transmitter 120 further includes a housing 270. Since the housing 270 according to the embodiment is similar to the above-described housing 270, the details will be omitted. In the housing 270 of this embodiment, the wireless transmitting unit 220 is disposed on at least one side surface as well as the rear surface of the wireless power receiver 130. The wireless transmitting unit may be disposed on the rear surface of the wireless power receiver 130 and at least one of the side surfaces of the wireless power receiver 130. The wireless transmitting unit 220 may be disposed on least one of the inner side surfaces 273, 274, 275 and 276 at an inside of the bottom surface 272 of the housing 270.

For example, the first wireless transmitting unit 231 may be disposed on the rear surface of the wireless power receiver 130. The first wireless transmitting unit 231 may be disposed on the inner side surface at the inside of the housing 270. The second wireless transmitter 233 is disposed two of the side surfaces of the wireless power receiver 130. The second wireless transmitting unit 233 may be disposed on two of the inner side surfaces 273, 274, 275 and 276 of the housing 270.

The second wireless transmitting unit 233 may be disposed on two of the inner side surfaces 273, 274, 275 and 276, which face each other. The second wireless transmitting unit 233 may be disposed on an upper portion based on the first wireless transmitting unit 231. The second wireless transmitting unit 233 may be inclined to the first wireless transmitting unit 231. A center of the second wireless transmitting unit 233 may be aligned on the same axis with a center of the wireless power receiver 130.

In the housing 270 of this embodiment, the first and second wireless transmitting units 231 and 233 are spaced apart from each other. Interference may be prevented or stopped between the first and second wireless transmitters 231 and 233. An overlap area of the first wireless transmitting unit 231 and the wireless power receiver 130 and an overlap area of the second wireless transmitting unit 233 and the wireless power receiver 130 extend and are secured. The charging efficiency in the wireless power transmitter 120 for the wireless power receiver 130 may be improved.

In the wireless power transmitter 120 of the embodiment, a position and a posture of the second wireless transmitting unit 233 are variously changeable. As shown in (a) of FIG. 9, the second wireless transmitting unit 233 may be disposed on the remaining two of the inner side surfaces 273, 274, 275 and 276, which face each other. Further, as shown in (b) and (c) of FIG. 9, the second wireless transmitting unit 233 may be disposed on one of the inner side surfaces 273, 274, 275 and 276. Although not shown, the second wireless transmitting unit 233 may be disposed on three or four of the inner side surfaces 273, 274, 275 and 276. As shown in (a) of FIG. 10, the second wireless transmitting unit 233 may be disposed in perpendicular to the first wireless transmitting unit 231. As shown in (b) of FIG. 10, the second wireless transmitting unit 233 may be disposed at a lower portion based on the first wireless transmitting unit 231. In this case, as shown in (c) of FIG. 10, the housing 270 may be implemented without the receiving groove 271.

According to the embodiment, the wireless power transmitter 120 may include the first and second wireless transmitting units 231 and 233, such that the wireless power receiver 130 may be charged according to various charging schemes. For this reason, the wireless power transmitter 120 may more efficiently charge the wireless power receiver 130. In this case, the first and second wireless power transmitting units 231 and 233 of the wireless power transmitter 120 may be spaced apart from each other and the overlap areas of each of the first and second wireless power transmitting units 231 and 233 with respect to the wireless power receiver 120 may be secured. Thus, the charging efficiency of the wireless power transmitter 120 to the wireless power receiver may be more improved.

The embodiment provides a wireless power transmitter for effectively charging an electronic appliance.

There is provided a wireless power transmitter for charging a wireless power receiver, which includes a first wireless transmitting unit disposed at a rear surface of the wireless power receiver and having a first charging scheme; and a second wireless transmitting unit disposed on at least one of side surfaces of the wireless power receiver and having a second charging scheme different from the first charging scheme.

The wireless power transmitter further includes a control unit for transmitting power through the first wireless transmitting unit or the second wireless transmitting unit according to a charging scheme of the wireless power receiver.

The second wireless transmitting unit is inclined from the first wireless power transmitter.

The second wireless transmitting unit is perpendicular to the first wireless transmitting unit.

A center of the second wireless transmitting unit is aligned on a same axis with a center of the wireless power receiver.

According to the embodiment, the wireless power transmitter includes the first and second wireless power transmitting units and may charge the wireless power receiver in various charging schemes. Thus, the wireless power transmitter may more efficiently charge the wireless power receiver. In this case, the first and second wireless power transmitting units of the wireless power transmitter can be spaced apart from each other and overlap areas of the first and second wireless power transmitting units with respect to the wireless power receiver may be secured. Thus, the charging efficiency of the wireless power transmitter to the wireless power receiver may be more improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transmitter for charging a wireless power receiver, the wireless power transmitter comprising;
   a housing having a receiving groove, the housing receiving the wireless power receiver in the receiving groove; and
   a first wireless transmitter having a first charging scheme and a second wireless transmitter having a second charging scheme, the first wireless transmitter and the second wireless transmitter being accommodated in the housing;
   wherein the receiving groove has a bottom surface and an inner side surface that is inclined from the bottom surface,
   wherein the first wireless transmitter is provided to face the bottom surface, and
   wherein the second wireless transmitter is provided to face the inner side surface.

2. The wireless power transmitter of claim 1, wherein the first wireless transmitter includes a first coil, and
   wherein the first coil is provided to face the bottom surface.

3. The wireless power transmitter of claim 1, wherein the second wireless transmitter includes a second coil, and
   wherein the second coil is provided to face the inner side surface.

4. The wireless power transmitter of claim 3, wherein the second coil is provided away from a first coil of the first wireless transmitter toward a top surface of the housing.

5. The wireless power transmitter of claim 3, wherein the second coil is provided in a region that is outside of a region where the first coil is provided.

6. The wireless power transmitter of claim 1, wherein a bottom portion width of the receiving groove is smaller than a top portion width of the receiving groove.

7. The wireless power transmitter of claim 1, further comprising a controller that transmits power through the first wireless transmitter or the second wireless transmitter based on a charging scheme of the wireless power receiver.

8. The wireless power transmitter of claim 1, further comprising an interface that receives power from a power supply and provides the power to the wireless power transmitter.

9. The wireless power transmitter of claim 1, wherein the first charging scheme is an electromagnetic induction scheme.

10. The wireless power transmitter of claim 1, wherein the second charging scheme is a resonance scheme.

11. A wireless power transmitter for charging a wireless power receiver, the wireless power transmitter comprising;
    a housing having a having a placement surface, the housing receiving the wireless power receiver on the placement surface; and
    a first wireless transmitter having a first charging scheme and a second wireless transmitter having a second charging scheme, the first wireless transmitter and the second wireless transmitter being accommodated in the housing;
    wherein the housing has a bottom surface and an outer side surface this is inclined from the bottom surface,
    wherein the first wireless transmitter is provided to face the bottom surface, and
    wherein the second wireless transmitter is provided to face the outer side surface.

12. The wireless power transmitter of claim 11, wherein the first wireless transmitter has a first coil, and
    wherein the first coil is provided to face the bottom surface.

13. The wireless power transmitter of claim 11, wherein the second wireless transmitter has a second coil, and
    wherein the second coil is provided to face the outer side surface.

14. The wireless power transmitter of claim 13, wherein the second coil is positioned away from a first coil of the first wireless transmitter toward a top surface of the housing.

15. The wireless power transmitter of claim 13, wherein the second coil is provided in a region of the housing that is outside the region of housing where the first coil is provided.

16. The wireless power transmitter of claim 11, wherein a bottom portion width of the housing is larger than a top portion width of the placement surface.

17. The wireless power transmitter of claim 11, further comprising a controller that transmits power through the first wireless transmitter or the second wireless transmitter according to a charging scheme of the wireless power receiver.

18. The wireless power transmitter of claim 11, further comprising an interface that receives power from a power supply and provides the power to the wireless power transmitter.

19. The wireless power transmitter of claim 11, wherein the first charging scheme is an electromagnetic induction scheme.

20. The wireless power transmitter of claim 11, wherein the second charging scheme is a resonance scheme.

* * * * *